(12) United States Patent
Rogers (10) Patent No.: US 7,686,339 B2
(45) Date of Patent: Mar. 30, 2010

(54) SEAT BELT APPARATUS

(75) Inventor: Robert F. Rogers, Orion, MI (US)

(73) Assignee: TK Holdings Inc., Auburn Hills, MI (US)

( * ) Notice: Subject to any disclaimer, the term of this patent is extended or adjusted under 35 U.S.C. 154(b) by 172 days.

(21) Appl. No.: 11/892,957

(22) Filed: Aug. 28, 2007

(65) Prior Publication Data

US 2008/0054616 A1 Mar. 6, 2008

Related U.S. Application Data

(60) Provisional application No. 60/823,997, filed on Aug. 30, 2006.

(51) Int. Cl.
*B60R 22/38* (2006.01)
(52) U.S. Cl. .................. 280/805; 280/806; 297/470; 242/381
(58) Field of Classification Search .......... 280/805, 280/806; 297/470; 242/381, 382
See application file for complete search history.

(56) References Cited

U.S. PATENT DOCUMENTS

| | | | |
|---|---|---|---|
| 5,788,281 A * | 8/1998 | Yanagi et al. ............... 280/806 |
| 5,794,878 A * | 8/1998 | Carpenter et al. ........... 242/381 |
| 6,019,392 A | 2/2000 | Karlow | |
| 6,129,385 A | 10/2000 | Blackadder | |
| 6,196,589 B1 * | 3/2001 | Smithson et al. ............ 280/805 |
| 6,209,916 B1 * | 4/2001 | Smithson et al. ............ 280/805 |
| 6,290,159 B1 | 9/2001 | Specht et al. | |
| 6,598,822 B2 * | 7/2003 | Nagata et al. ............. 242/379.1 |
| 6,705,559 B1 * | 3/2004 | Sullivan et al. ............ 242/381 |
| 6,786,511 B2 | 9/2004 | Heckmayr | |
| 7,216,827 B2 * | 5/2007 | Tanaka et al. ............ 242/390.8 |
| 2006/0208475 A1 * | 9/2006 | Kitazawa et al. ............ 280/806 |

* cited by examiner

*Primary Examiner*—Toan C To
(74) *Attorney, Agent, or Firm*—Foley & Lardner LLP (57) ABSTRACT

A seat belt apparatus is disclosed that includes a rotatable spool connected to the seat belt webbing and at least one variable energy absorbing mechanism connected to an end of the rotatable spool. The variable energy absorbing mechanism may include a chamber configured to be filled with a fluid and a flexible member attached to an outer circumference of the rotatable spool within the chamber.

20 Claims, 7 Drawing Sheets

SEAT BELT APPARATUS

BACKGROUND

The present invention relates generally to the field of seat belt restraints in motor vehicles. In particular, the present invention relates to a continuously variable energy absorbing mechanism used in seat belt retractors of seat belt apparatuses.

Current seat belt energy absorbing designs have fixed levels of resistance to occupant loading. If the level of resistance is switchable, it is either dependent on the amount of webbing extraction or on outside signals from external sensors that detect the weight of the occupant and/or the crash severity. Unfortunately, the drawback to these designs is that they are costly.

An example of a known energy absorbing mechanism is disclosed in U.S. Pat. No. 6,786,511 (herein incorporated by reference in its entirety), which discloses a belt retractor with a rotor having rotary vanes in a load limiting medium in which each vane has a flow channel. Upon a crash event, the rotor rotates with the belt reel which causes the load limiting medium to flow through the flow channel from one side of the vane to the other. With this fluid flow, energy is consumed and the force acting between the seat belt and the occupant is limited.

U.S. Pat. No. 6,129,385 (herein incorporated by reference in its entirety) discloses a belt retractor that comprises a load limiting apparatus in the form of a spindle with paddles in a circular chamber filled with fluid. When the seat belt webbing is under tension in a crash, the spindle rotates which causes the fluid in the chamber to be pushed into a load limiting assembly via an opening. The fluid flow through the load limiting assembly absorbs some of the force of the crash.

U.S. Pat. No. 6,290,159 (herein incorporated by reference in its entirety) discloses a belt retractor that comprises a load limiter in the form of a hydraulic pump attached to a fluid circuit. During a crash event, the forward displacement of the occupant causes the belt reel and a drive coupled to the belt reel to rotate. The drive rotates the hydraulic pump which, in turn, conveys an incompressible liquid into the closed circuit so that energy is absorbed.

SUMMARY

According to one embodiment of the present invention, a seat belt apparatus may comprise a seat belt webbing for occupant restraint; a rotatable spool connected to the seat belt webbing and rotatably supported by a base frame; a locking mechanism; and at least one variable energy absorbing mechanism connected to an end of the rotatable spool. The variable energy absorbing mechanism may comprise a chamber configured to be filled with a fluid and a flexible member attached to an outer circumference of the rotatable spool within the chamber. The locking mechanism prevents rotation of the chamber during a crash event According to another embodiment of the present invention, a seat belt apparatus may comprise: a rotatable spool; and a variable energy absorbing mechanism. The variable energy absorbing mechanism may comprise a flexible member attached to a circumferential surface of the rotatable spool and disposed inside a chamber filled with fluid. During a crash event, energy may be absorbed by a drag of the flexible member through the fluid and by deformation of the flexible member.

According to another embodiment of the present invention, a seat belt apparatus may comprise a variable energy absorbing mechanism configured to adjust a resistant energy absorbing force of a vehicle occupant during a crash event; and a rotatable spool configured to connect to a seat belt webbing and rotatably supported by a base frame. The energy absorbing mechanism may absorb an impact energy against a vehicle occupant.

It is to be understood that both the forgoing general description and the following detailed description are exemplary only, and are not restrictive of the invention as claimed.

BRIEF DESCRIPTION OF THE DRAWINGS

The features, aspects, and advantages of the present invention will become apparent from the following description and the accompanying exemplary embodiments shown in the drawings, briefly described below.

DETAILED DESCRIPTION OF THE DRAWINGS

In broad terms, the seat belt apparatus according to an embodiment of the present invention may incorporate an energy absorbing (EA) mechanism linked to a rotatable spool. The EA mechanism may automatically adjust the resistant energy absorbing force based on the occupant loading imparted to the seat belt webbing with a corresponding force to the rotatable spool. The EA mechanism may use a hydraulic and/or spring action to increase the resistance of the rotatable spool as the seat belt load increases and decrease the resistance as the seat belt load decreases, providing a more constant or stable velocity or acceleration of the occupant by way of the seat belt webbing.

This energy absorbing mechanism may be limited to one or less revolutions of the rotatable spool or it may provide a range of operation to the limit of the webbing available on the rotatable spool. This mechanism may be used in conjunction with a constant energy absorbing mechanism, such as a torsion bar, or without such a mechanism.

Figure 1:
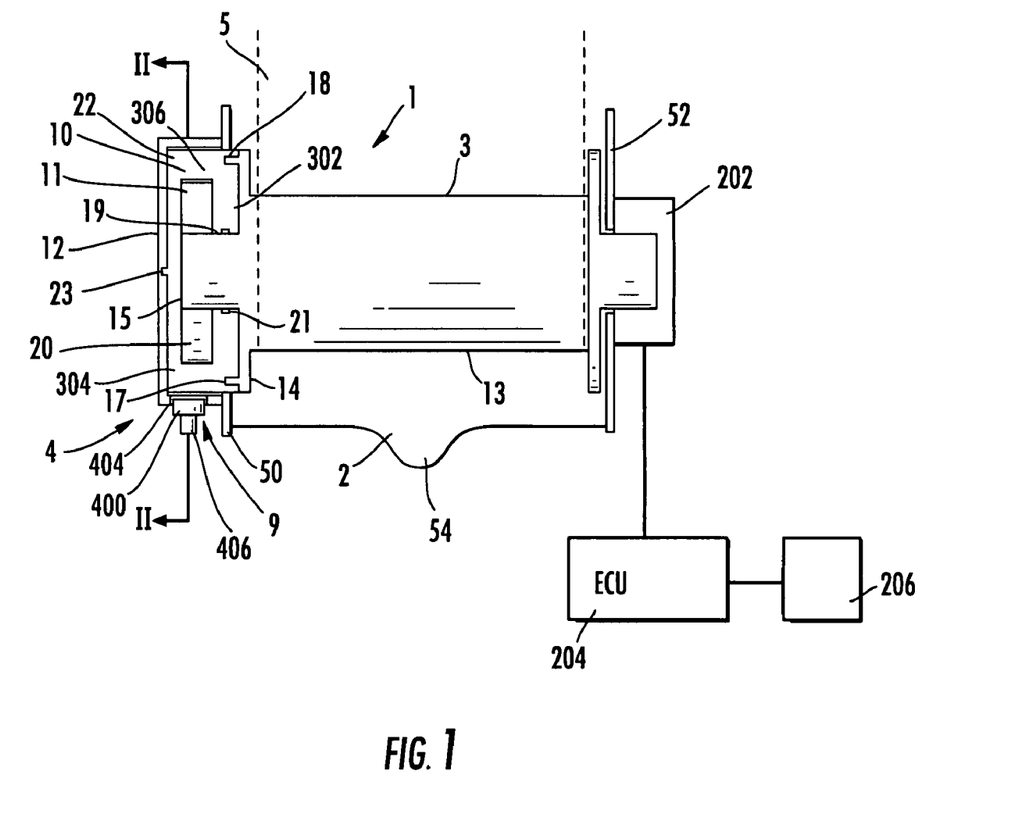
FIG. 1 is a schematic view of a seat belt apparatus according to an embodiment of the present invention.

FIG. 1 shows one embodiment of the present invention. The seat belt apparatus 1 of FIG. 1 may comprise a seat belt webbing 5, a base frame 2, a rotatable spool 3 rotatably supported by the base frame, a belt retracting mechanism 202, and a variable EA mechanism 4 for absorbing the impact energy of the webbing acting against a vehicle occupant.

Figure 5:
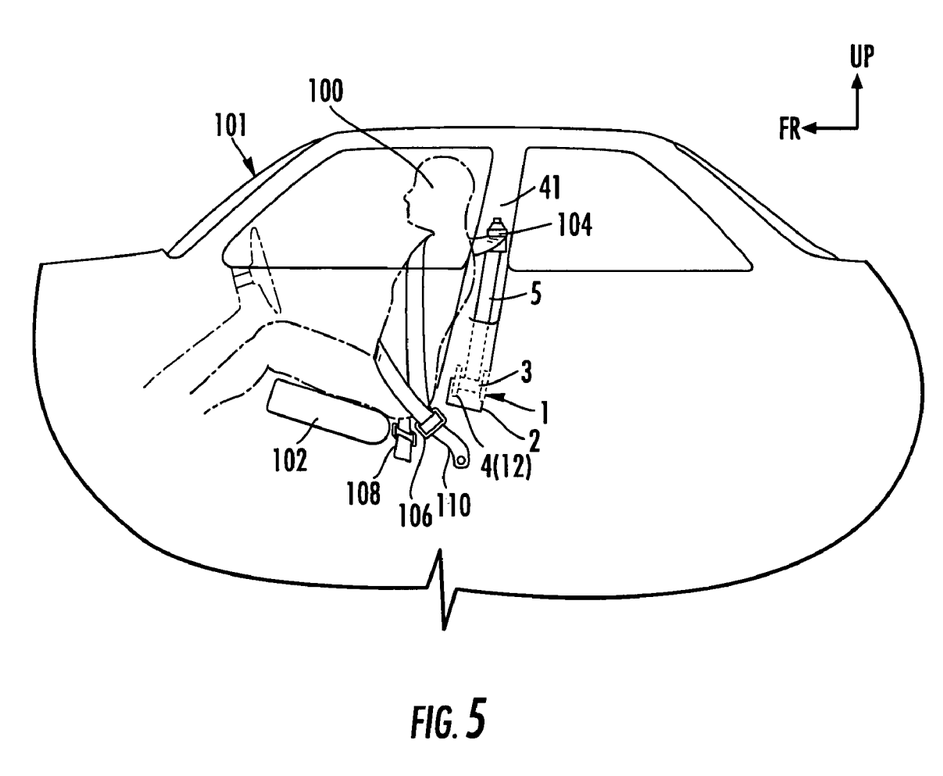
FIG. 5 is a schematic view of the seat belt apparatus according to an embodiment of the present invention in relation to the interior of a vehicle and an occupant.

The seat belt webbing 5 may be any kind known in the art, and is used for restraining a vehicle occupant 100, such as a driver or passenger, seated in a vehicle seat 102, as seen in FIG. 5. The webbing may be a long belt which is wound onto the spool 3 (which may be located, for example, in the center pillar of the vehicle 101). From the spool 3, the webbing 5 is fed through a shoulder anchor 104 located around the shoulder of the vehicle occupant, crosses around the upper body of the occupant 100, is fed through a tongue 106, crosses the lap of the occupant 100, and is anchored at an outer anchor 108 mounted on the vehicle, such as on the floor of the vehicle 101 or one the side of the vehicle seat 102. The tongue fits into a buckle 110 as is known in the art to secure the seat belt webbing to the occupant.

The base frame 2 may connect to an interior portion of a vehicle and may allow the rotation of the rotatable spool 3. The base frame 2 may be located within a center vehicle pillar or adjacent to an occupant driver, passenger, or rear vehicle seat. For example, FIG. 5 shows an embodiment in which the base frame 2 is located in the center vehicle pillar adjacent to the front passenger seat. During normal operation, the rotatable spool 3 may freely rotate about the base frame 2 to the limiting length of the seat belt webbing 5 so as to wind or unwind an appropriate length of webbing for occupant use. The base frame may include two side walls 50 and 52 on which the rotatable spool 3 may rotate. Additionally, the base frame may include a back wall 54 connecting the two side walls 50 and 52 for maintaining the side walls 50 and 52 in fixed locations relative to each other and for mounting the seat belt apparatus to the vehicle, as seen in FIG. 5.

The rotatable spool 3 may be any kind of spool known in the art, and may be supported between the two side walls of the base frame 2. The spool 3 may typically include a middle portion 13, a set of flanges 14, and at least one protrusion 15. The middle portion 13 may be generally cylindrical, and the seat belt webbing 5 may be wound onto it. The spool may, for example, be a reel spool.

The rotatable spool 3 may attach to a chamber 10 of the variable EA mechanism 4 at shearable pins 17 located on the surface of the flange 14, which abuts against the chamber 10. The pins 17 may either be integral to the flange 14 or may be separate pins that fit into recesses in the flange 14. The pins 17 also fit inside recesses 18 located on the surface of the chamber 10 that abuts against the flange 14. The pins 17 permit the chamber 10 to rotate with the rotatable spool 3 during the normal operation of the seat belt apparatus. Although only two pins 17 are shown, any suitable number of pins may be used, such as one, two, three, or more pins.

On the rotatable spool 3, a protrusion 15 protrudes out from the center of the flange 14. The protrusion 15 integrates with the chamber 10 to facilitate energy absorption during a crash event. The protrusion 15 of the rotatable spool 3 fits inside an aperture 19 of the chamber 10 that leads to a cavity 20. The cavity 20 is contained within the exterior walls 22 of the chamber 10, and constructed with a suitable thickness to maintain operation of the EA mechanism. During normal operation the protrusion 15 rotates inline with the rotatable spool 3 and the chamber 10. Upon a crash event, the energy absorbing device may limit the rotation via the protrusion 15.

On one of the sidewalls 52 of the base frame 2, a belt retracting mechanism 202 may be employed. The belt retracting mechanism may be a power transmission mechanism and motor that is known in the art for rotating the rotatable spool so as to tighten the seat belt webbing around the vehicle occupant upon the detection of the occurrence of a crash event or the determination that a crash event is imminent. To operate the belt retracting mechanism 202, an electronic computing unit (ECU) 204 may be used. The ECU 204 receive signals from one or more sensors 206. These sensors may be impact sensors, sensors that detect rapid deceleration, or the like. The ECU processes the signals from these sensors and, if it is determined that a crash is imminent or occurring, the ECU operates the motor of the belt retracting mechanism 202 to rotate the spool 3, causing the belt webbing to be wound onto the spool such that the belt webbing tightens around the vehicle occupant. According to another embodiment, the belt retracting mechanism may be a rewind spring or other type of belt retracting mechanism.

Figure 2:
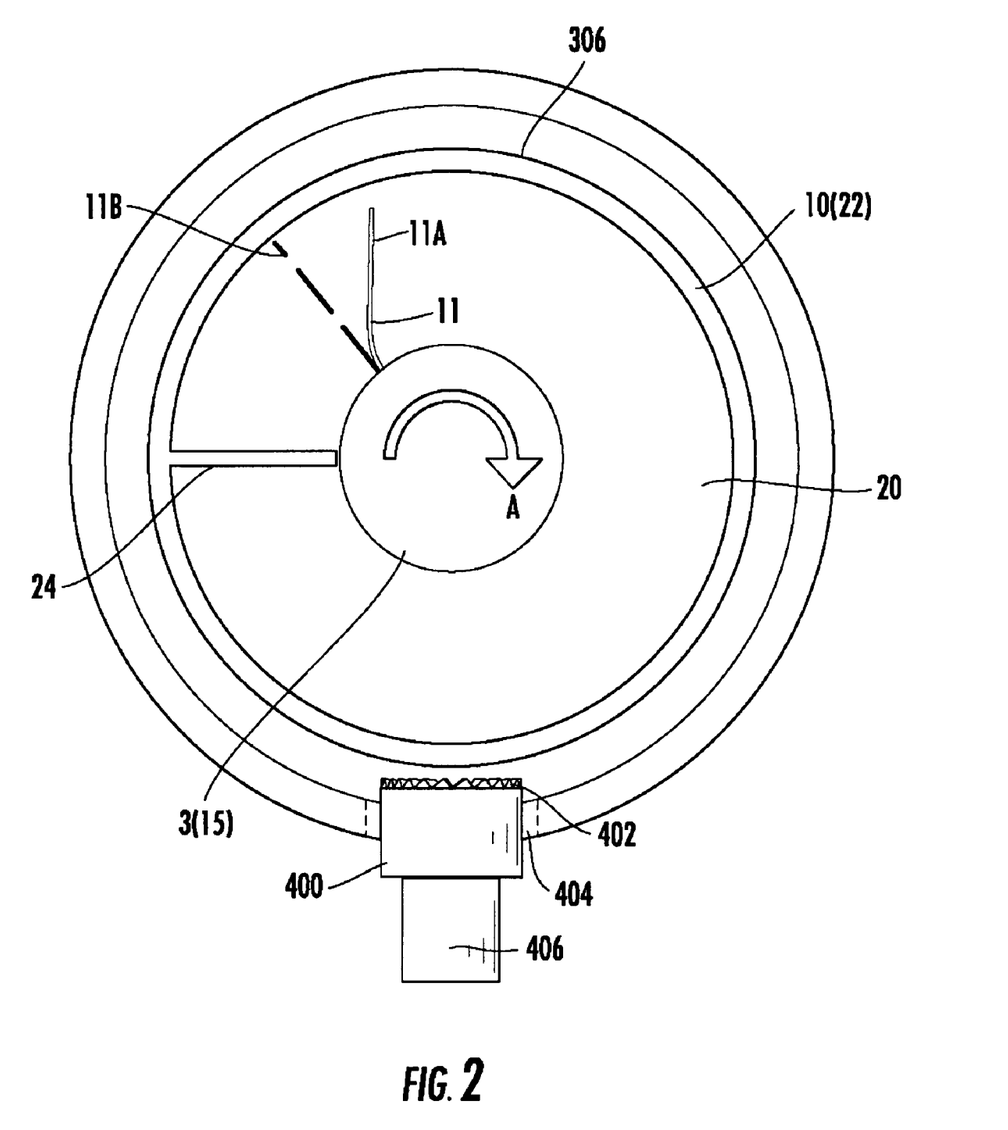
FIG. 2 is a cross-sectional view of the variable energy absorbing mechanism taken along line II-II shown in FIG. 1.

On another of the side walls 50 of the base frame 2, the variable EA mechanism 4 is mounted. The variable EA mechanism 4 may limit the length of the seat belt webbing 5 to be unwound in reaction to the inertia force of the vehicle occupant acting on the seat belt webbing 5 after a crash event. The variable EA mechanism 4 may include a chamber 10 configured to be filled with a fluid, a flexible member 11 attached to an outer circumference of the rotatable spool 3 within the chamber 10 at the at least one protrusion 15, a cover 12, and a locking mechanism 9, as seen in FIGS. 1 and 2. During normal operation, the chamber 10 rotates in conjunction with the rotatable spool 3 to unwind the seat belt webbing 5 caused by the impact force of the vehicle occupant upon the seat belt webbing. The amount of unwound seat belt webbing 5 may extend to the limiting length of the webbing 5.

The chamber 10 may include external walls 22 and a cavity 20 which may be filled with a fluid. The external walls may include two flat walls 302 and 304 and one circumferential wall 306. The external walls may be integrally formed together and/or be separate and distinct parts that are attached to each other in a leak-proof manner, such as by adhesives, brazing, welding, bolted together with O-rings, or the like. The chamber 10 may be made of any suitable material but must be compatible with the fluid contained inside the cavity 20. The chamber 20 also includes an aperture 19 on one of the flat walls 302 so that the protrusion 15 of the spool 3 can be inserted into the cavity 20 and one or more recesses 18 to accommodate the shearable pins 17 such that the chamber 10 is permitted to rotate with the rotatable spool 3 during the normal operation of the seat belt apparatus.

The chamber 10 may include an interior wall 24 that protrudes into the cavity 20. The interior wall 24 is used to provide sufficient resistance to the fluid so that the fluid is required to flow past the flexible member. The interior wall 24 does not abut against the protruding portion 15 of the rotatable spool 3 but may prevent the rotation of the rotatable spool 3 if the flexible member 11 comes into contact with the wall 24. The interior wall 24 may be placed anywhere along the inside of the cavity 20. In this case, the rotation of the spool may be performed for one rotation or less depending on the location of the interior wall 24 relative to the starting position of the flexible member 11 at the outset of the crash event. Thus, the energy absorbing mechanism may be limited to one or less revolutions of the rotatable spool 13. For example, when the flexible member 11 is located directly adjacent to the interior wall 24 on the side proximate the rotating direction of the rotatable spool 13, the flexible member may permit one complete revolution before abutting the opposite side of interior wall 24. Placed at any other location, the flexible member 13 will limit rotation to less than one rotation of the rotatable spool 13. Of course, with no interior wall 24, the rotation of the spool may be greater than one revolution, such as two, three, four, or more revolutions. Thus, an interior wall may be placed within the EA mechanism 4 to limit the rotation of the rotatable spool 3, after a crash, to one or less revolutions or, without the interior wall the rotatable spool 3 may rotate to the limiting length of the seat belt webbing attached to the rotatable spool.

Inside the cavity 20 of the chamber 10, at least one flexible member 11 and fluid are located. Shown in FIG. 2, the flexible member 11 may be attached to the outer circumference of the protrusion 15 of the rotatable spool 3 located within the cavity 20. The flexible member 11 may be a vane that is curve-shaped in which the flexible member 11 bends towards the rotating direction A of the rotating rotatable spool 3, which is the direction that the rotatable spool will rotate during a crash event to allow a limited length of seat belt webbing 5 to unwind. Suitable materials for the flexible member may include any suitable flexible material, such as plastic (polyvinyl chloride, polyethylene, silicones, polyurethanes, nylon, and other acrylics, polymers or elastomers) or metals (such as stainless steel, aluminum, brass, copper, or the like). The material thicknesses may be varied depending on the flexible material used. For example, the material thickness may be in the range of about 0.1 mm to about 10 mm, preferably around 1 mm. Also, the flexible member may have a non-uniform thickness and/or a non-uniform width so as to be any suitable shape. According to various embodiments of the present invention, more than one flexible member may be attached to the rotatable spool 3 at the protrusion 15. For example, one, two, three, four, or more flexible members may be used.

According to one embodiment of the present invention, the fluid may be a hydraulic fluid, such as water, mineral oil, or any other fluid of suitable viscosity. There may be a seal within or near the aperture 19 so as to prevent the fluid from exiting the cavity 20. For example, an O-ring 21 may be positioned around the outer circumference of the protrusion 15 but inside the diameter of the aperture 19. According to an alternate embodiment of the present invention, the fluid may be a rheological fluid, as will be described latter.

The cover 12 is attached to one side wall of the base frame 2, such as to the side wall 50 by any suitable fastening mechanism. The cover 12 is placed over the chamber 10 so that the chamber may rotate in conjunction with rotatable spool 3 within the cover 12 during the normal operation of the seat belt. The cover includes an aperture located at a center position 23 such that a protrusion can fit inside the aperture so that the chamber 10 is rotatably supported by the cover 12.

Figure 4:
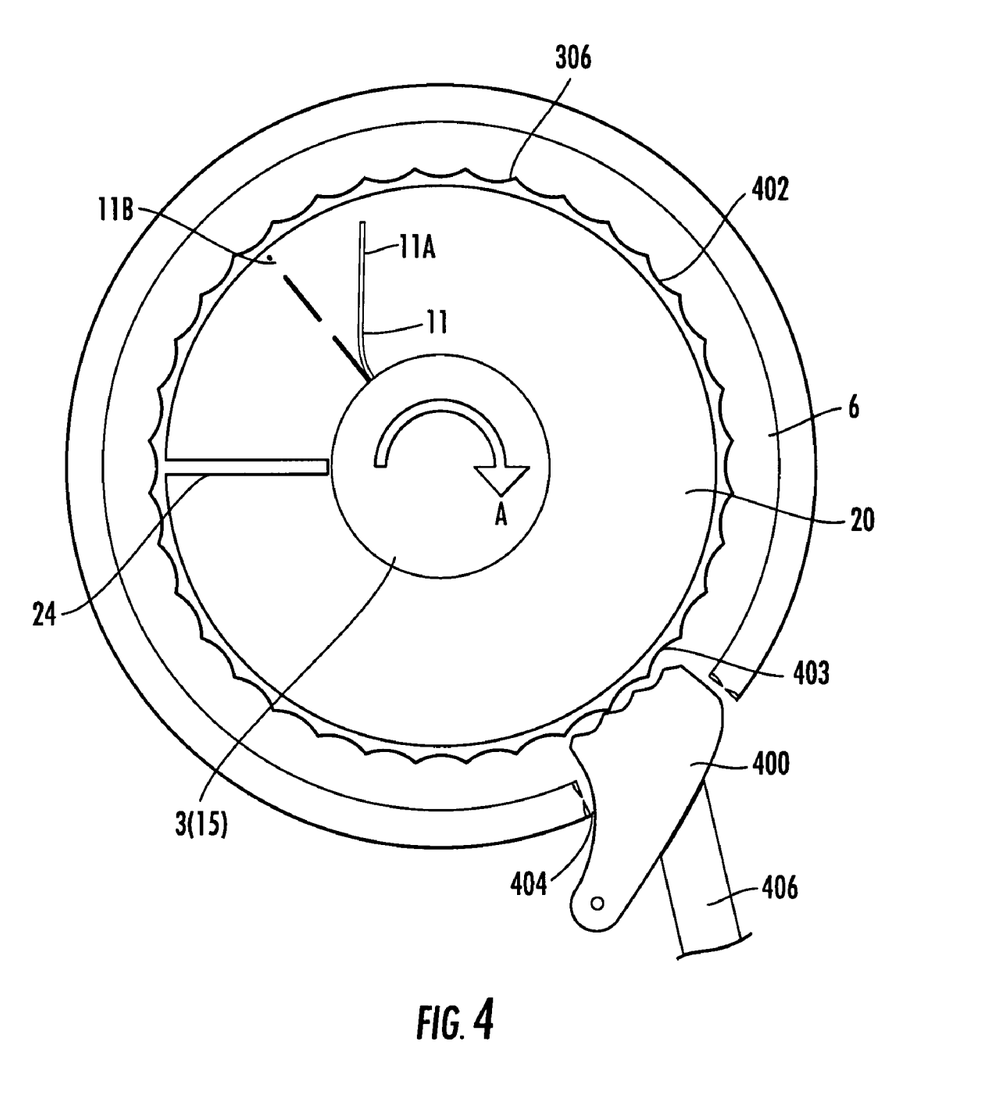
FIG. 4 is a cross-sectional view of the variable energy absorbing mechanism taken along line II-II shown in FIG. 1 according to another embodiment of the present invention.

The locking mechanism 9 attaches to or protrudes through the outer surface of the cover 12. The locking mechanism 9 is configured to prevent the chamber 10 from rotating during a crash event. As seen in FIG. 4, the locking mechanism may be a pawl 400 that is made to contact the circumferential wall 306 of the chamber 10 during a crash event by protruding through an aperture 404 of the cover 12. The outer circumferential wall 306 may have external teeth 403 to engage the pawl 400 such that, upon a crash event, the chamber 10 is prevented from rotating with the spool 3. The pawl 400 may be activated by an actuating device 406, such as a spring mechanism, a pyrotechnic device, or the like so as to cause the pawl 400 to emerge from the aperture 402 of the cover 12 and engage the external teeth of the chamber 10. Alternatively, the circumferential wall 306 of the chamber 10 may be smooth, as seen in FIG. 2. In such a case, the locking mechanism may be include a pawl 400 with cutting teeth 404, which prevent the chamber 10 from rotating by cutting into the circumferential wall 306 and stopping the rotation by friction.

The actuating device 406 that causes pawl 400 to come into contact with the circumferential surface of the chamber 10 may be activated by the ECU 204 upon receiving information from the sensors 206 regarding a crash event either occurring or becoming imminent. The actuating device 406 may be activated during or after the operation of the belt retracting mechanism 202.

Now, the operation of the seat belt apparatus will be explained. During the normal operation of the seat belt, the seat belt webbing 5 may be easily unwound from the middle portion 13 of the rotatable spool 3 because the spool is rotatably supported to the base frame 2. When an occupant applies pressure to the seat belt webbing 5, by pulling, pushing, leaning on, or any other physical movement, the webbing unwinds from rotatable spool 3. When the occupant relaxes, the webbing rewinds onto the rotatable spool 3 using the belt retracting mechanism 202.

During a crash event, the vehicle sensors 206 may detect a sudden deceleration of the vehicle or the impact of the crash itself. The signals detected by the sensors are processed by the ECU 204 (a controller or the like), which triggers the belt retracting mechanism 202 to wind up the seat belt webbing 5 onto the spool 3 and the locking mechanism 9 to lock the rotation of the chamber 10. The rotatable spool 3, however, may still rotate (i.e. exert a torque force about center position 23) due to the inertia force of the vehicle occupant moving forward and acting on the webbing 5. The pins 17 are sheared due to the rotatable spool's rotation and the chamber's immobility. However, the release of the seat belt webbing 5 is controlled due to the flexible member 11 moving through the fluid in the cavity 20 such that the chamber 10 facilitates energy absorption during the crash event. The variable energy absorbing mechanism 4 may limit the rotation of the rotatable spool 3, so that the length of webbing 5 to be unwound is less than or equal to the limiting length of webbing 5. The amount of webbing unwound may further be automatically adjusted depending on the resistant force of the occupant against the seat belt webbing.

If there is a low load condition acting on the seat belt webbing (e.g. a slight impact or a small vehicle occupant load), the flexible member 11 may simply move through the fluid without bending opposite the direction A of the rotating rotatable spool 3. Reference numeral 11A in FIG. 2 shows the flexible member 11 in this low load position. In this embodiment the flexible member is curve-shaped. Under low load, the resultant resistance of the energy absorbing mechanism corresponds to the pressure applied by the occupant against the seat belt webbing.

In the case of a high load condition acting on the seat belt webbing (e.g. a severe impact or a large vehicle occupant load), the flexible member 11 may bend backwards as it moves through the hydraulic fluid. Reference numeral 11B in FIG. 2 shows the flexible member in this high load position. The material and/or configuration of the flexible member may be selected such that the flexible member only bends far enough to come straight and no more (as seen in position 11B in FIG. 2). Under high load, the resultant resistance of the energy absorbing mechanism corresponds to the pressure applied by the occupant against the seat belt webbing. In addition, the flexibility and bending of the flexible member 11 allows it to move a greater distance about the rotatable spool 3 before contacting the interior wall 24 of the chamber 10 than when the flexible member remains in position 11A under a low load condition.

The movement of the flexible member through the fluid controls the pay out of seat belt webbing 5 because, once the flexible member 11 rotates around within the spool 3 and abuts against the interior wall 24, the rotatable spool 3 may no longer rotate. The flexible member may be constructed of a sufficiently rigid material such that the force of fluid may cause it to bend in the direction of reference number 11B, but would not bend when it contacts the interior wall 24.

In addition, serious injury to the vehicle occupant as a result of the force of the occupant acting on the seat belt webbing 5 may be lessened because the impact energy is absorbed by (1) the drag force of the flexible member 11 moving through the fluid and (2) the deformation of the flexible member from its bent shape caused by the drag force acting on the flexible member. As such, the movement of the flexible member 11 through the cavity 20 against the fluid, absorbs the momentum of the rotatable spool 3, which rotation is caused by the force of the occupant acting on the seat belt webbing 5.

FIG. 5 shows the seat belt apparatus 1 relative to an occupant 100 and vehicle 101. The variable energy absorbing mechanism 4 may be placed within a center pillar 41 of the vehicle 101 such that it may be hidden behind a vehicle garnish or trim along with the spool 3, the base frame 2, and the belt retracting mechanism 202. The seat belt webbing 5 may wind around the rotatable spool 3 and may secure the occupant 100 by attaching at buckle 110. The outer anchor 108 may secure the seat belt webbing 5 across the occupant's lap. The rotatable spool 3 and the energy absorbing mechanism 4 may attach to the vehicle by the base frame 2. During a crash event, the energy absorbing mechanism 4 functions as described above to absorb the impact energy of the occupant against seat belt webbing 5 as the occupant is thrown forward in the direction of arrow FR. The energy absorbing mechanism 4 may work whether the occupant's force load is applied against the lap portion of the seat belt webbing 5 or against the shoulder strap portion.

In another embodiment of the seat belt apparatus 1, the rotatable spool 3 and energy absorbing mechanism 4 may be attached at outer anchor 108, or any other suitable position within the vehicle to allow for the proper winding and unwinding of the seat belt webbing during normal operation and/or a crash event.

Figure 3:
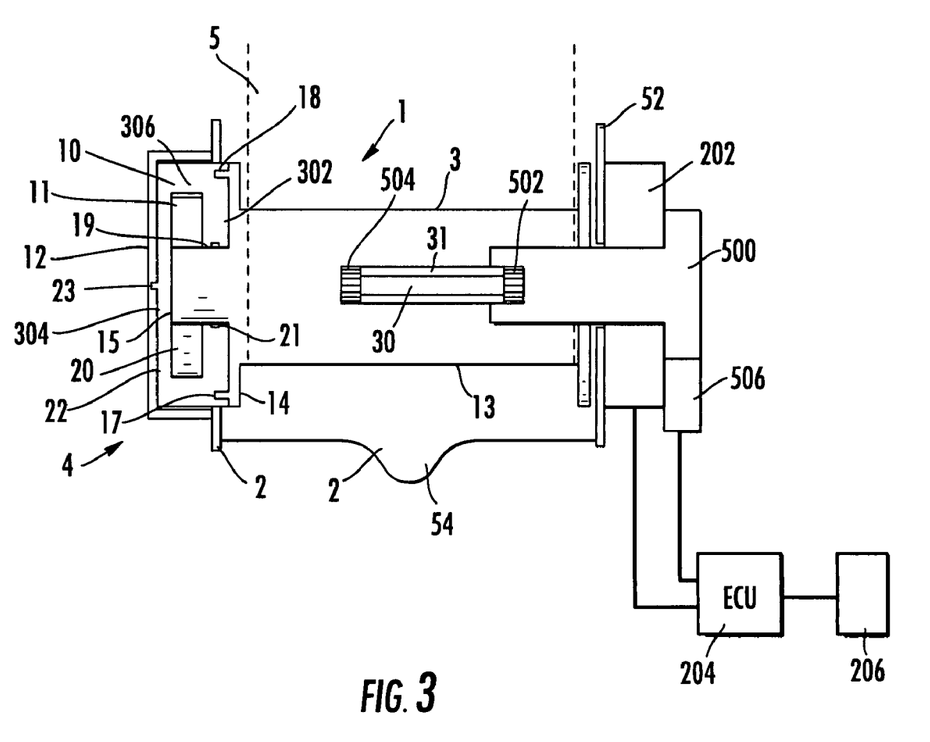
FIG. 3 is a schematic view of a seat belt apparatus according to another embodiment of the present invention.

In another embodiment of the seat belt apparatus as shown in FIG. 3, the energy absorbing mechanism may work in conjunction with one or more other energy absorbing mechanisms, such as a torsion bar 30. If a torsion bar 30 is used, the energy absorbing mechanism 4 operates substantially the same as described above. However, the seat belt apparatus further comprises a torsion bar 30 in a central passage 31 of the rotatable spool 3. One end 504 of the torsion bar 30 is attached to the rotatable spool 3 in the conventional manner (for example, a splined connection) near the side with the energy absorbing mechanism 4. The other end 502 of the torsion bar 30 is attached to a locking base 500, which rotates inside the opposing side wall 52 of the base frame 2 on the opposite side of the rotatable spool 3. The locking base may be fed through or associated with the locking mechanism 9 which prevents the rotation of the spool 3 on the end of the spool opposite to the spool with the mounted chamber 10 during a crash event.

In normal operation, the torsion bar 30, the belt retracting mechanism 202, and the locking base 50 rotate as a single unit. During the crash event, a second locking mechanism 506 prevents the locking base 500 from rotating, which in turn prevents one side 502 of the torsion bar 30 attached to the locking base 500 from turning. The other side 504 of the torsion bar 30, which is attached to the rotatable spool 3, is still free to rotate due to the inertia force of the vehicle occupant acting upon the seat belt webbing 5 during the crash event. The torsion bar 30 then twists; thus absorbing some energy of the impact corresponding to the force of the occupant acting against the seat belt webbing 5.

At the same time, the locking mechanism 9 attached to or protruding through the cover 12 prevents the rotation of the chamber 10. As a result of the rotatable spool's rotation, the flexible member 11 moves through the fluid in the cavity 20 and/or the flexible member 11 is bent in the direction opposite the rotation of the rotatable spool 3 (as seen in FIG. 2); thus, additional energy is absorbed.

Figure 6:
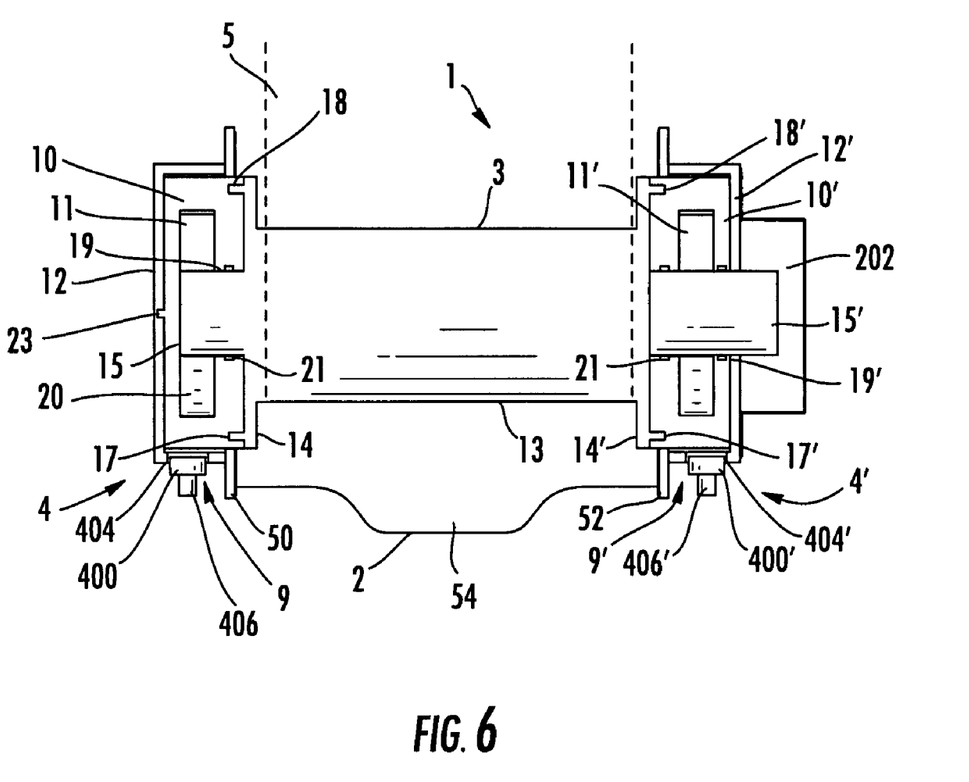
FIG. 6 is a schematic view of a seat belt apparatus according to another embodiment of the present invention.

Another embodiment shown in FIG. 6 shows two EA mechanisms 4 and 4' that may be used. Thus, there is an energy absorbing mechanism on either side of the rotatable spool 3. During a crash event, one or both of the corresponding chambers 10, 10' of the energy absorbing mechanisms 4 and 4' are locked in position by locking mechanisms 9 and 9'. The protrusion 15' of the spool 3 is fed through the chamber 10' and the cover 12' of the additional EA mechanism 4' and is connected to the belt retracting mechanism 202. An additional seal 19' may be necessary so as to prevent the fluid inside the cavity 20' from leaking. The second EA mechanism 4' acts in essentially the same way as the EA mechanism 4. When the chamber 10' is locked by the locking mechanism 9', the rotatable spool 3 is still free to rotate because the pins 17' have sheared. The movement of flexible member 11' through the fluid in the chamber 10' further impedes rotation of the rotatable spool 3 and may automatically absorb the impact of the occupant on the seat belt during a crash.

Figure 7:
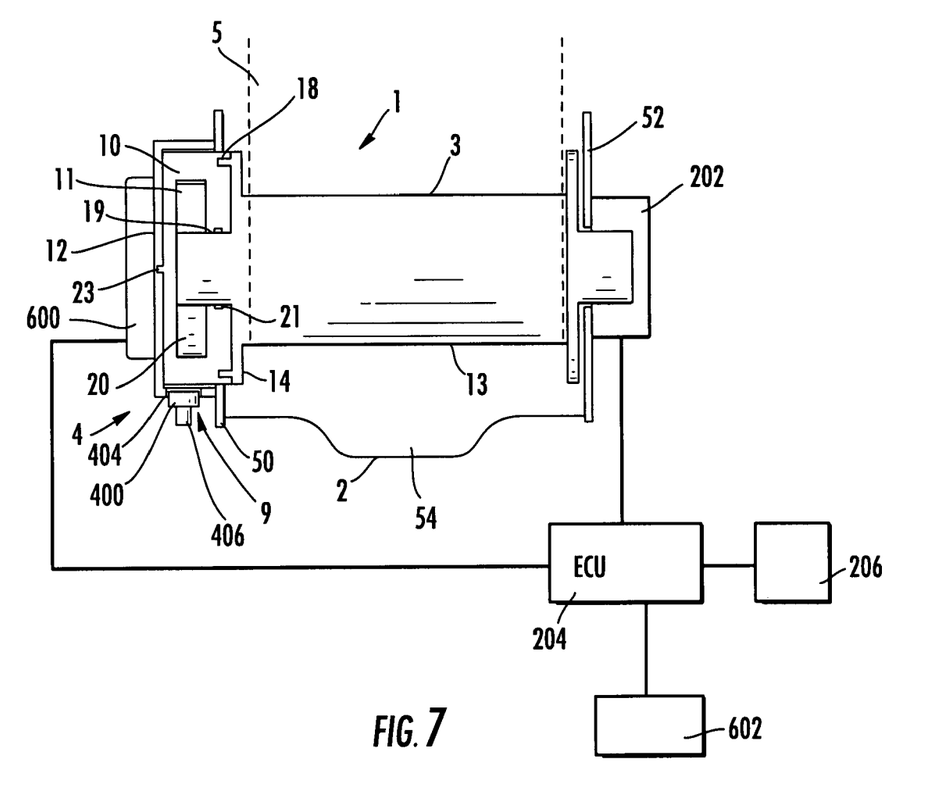
FIG. 7 is a schematic view of the variable energy absorbing apparatus for a seat belt apparatus according to another embodiment of the present invention

In yet another embodiment of the present invention as seen in FIG. 7, the hydraulic fluid may be a rheological fluid, which is a fluid whose viscosity may be controlled by applying an electric current or introducing a magnetic field. Thus, the viscosity of the fluid may be adjusted depending on the vehicle occupant or other design considerations. In other words, a rheological fluid would permit that viscosity of the fluid inside the chamber 10 to be fine tuned or to be customized to a particular vehicle occupant. For example, the rheological fluid may be a magnetorheological (MR) fluid or an electrorheological (ER) fluid. An MR fluid comprises a suspension of micrometer-sized magnetic particles in a carrier fluid, such as oil. When subjected to a magnetic field, the fluid greatly increases its viscosity. An ER fluid is a suspension of extremely fine non-conducting particles (up to 50 micrometers) in an electrically insulating fluid. When subjected to an electric field, the viscosity of this type of fluid changes. If one of these types of fluids is used, the seat belt device may then comprise the use of an actuating device 600, as seen in FIG. 7.

The actuating device 600 can be a device known in the art for creating a magnetic field in the case of an MR fluid being the fluid in the chamber 10. For example, one such actuating device may be an electromagnet or any other magnetic field generating/altering device known in the art. One example of a suitable fluid and actuating device can be found in U.S. Pat. No. 6,019,392, herein incorporated by reference. Alternatively, if an ER fluid is used, the actuation device can be any device known in the art for creating an electric field. For example, one such actuating device may be an electric field generator.

The actuating device 600 may be controlled by the ECU 204 such that the magnetic or electric field may be altered by the actuating device based on the signals from the ECU 204. The ECU 204 would receive signals from, for example, a sensor 602 that determines the weight of a vehicle occupant. Once the ECU determines the weight of the occupant, the ECU may then send a command to the actuating device so as to change the viscosity of the fluid based on the occupant's weight. For example, if the occupant is a small child, the viscosity of the fluid may be lowered so as to prevent unnecessary injury to the child.

If merely hydraulic fluid is used or rheological fluid without using the actuating device 600, the disclosed seat belt apparatus may provide a variable EA mechanism in a seat belt apparatus that does not rely on external sensors to detect the occupant size and/or crash severity. The design may improve occupant restraint performance as it relates to the occupant size and crash severity while doing so at a significantly reduced cost. Thus, a variable absorption of the force of a vehicle occupant against a seat belt webbing during a crash event is achieved without the need of external sensors to detect occupant size and/or crash severity.

According to one embodiment of the present invention, a seat belt apparatus may have a variable EA mechanism comprising a flexible member that is attached to the circumferential surface of the rotatable spool of the seat belt apparatus and that is disposed inside a chamber filled with a fluid. Rheological or hydraulic fluid may be used as the fluid in the chamber of the energy absorbing mechanism. During a crash event, the energy absorbing mechanism may be locked into position by a locking mechanism and some energy of the crash is absorbed by (1) the drag force of the flexible member moving through the hydraulic fluid and (2) the deformation of the flexible member from its bent shape caused by the drag force acting on the flexible member.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt apparatus, comprising:
    a seat belt webbing for occupant restraint;
    a rotatable spool connected to the seat belt webbing and rotatably supported by a base frame;
    at least one variable energy absorbing mechanism connected to an end of the rotatable spool, wherein the variable energy absorbing mechanism comprises:
    a chamber configured to be filled with a fluid;
    a flexible member attached to an outer circumference of the rotatable spool within the chamber; and
    a locking mechanism for preventing rotation of the chamber during a crash event.

2. The seat belt apparatus of claim 1, further comprising a constant energy absorbing mechanism connected to the rotatable spool, and configured to be locked in a fixed position by the locking mechanism during the crash event.

3. The seat belt apparatus of claim 2, wherein the constant energy absorbing mechanism is a torsion bar.

4. The seat belt apparatus of claim 1, wherein the flexible member is a vane.

5. The seat belt apparatus of claim 4, wherein the flexible vane is curved.

6. The seat belt apparatus of claim 1, wherein the flexible member of the variable energy absorbing mechanism is limited to one or less revolutions of the rotatable spool.

7. The seat belt apparatus of claim 1, further comprising a fluid within the chamber, and wherein the fluid is hydraulic or rheological.

8. A seat belt apparatus, comprising:
    a rotatable spool; and
    a variable energy absorbing mechanism, wherein the variable energy absorbing mechanism comprises:
    a flexible member attached to a circumferential surface of the rotatable spool and disposed inside a chamber filled with fluid,
    wherein during a crash event energy is absorbed by drag of the flexible member through the fluid and by deformation of the flexible member.

9. The seat belt apparatus of claim 8, wherein the chamber is filled with hydraulic or rheological fluid.

10. The seat belt apparatus of claim 8, further comprising an interior wall protruding inside the chamber, wherein the interior wall engages with the flexible member and limits rotation of the rotatable spool to one or less revolutions.

11. The seat belt apparatus of claim 8, wherein flexible member is curve-shaped.

12. The seat belt apparatus of claim 8, further comprising a locking mechanism, wherein the chamber is locked in position by the locking mechanism during the crash event.

13. A seat belt apparatus, comprising:
    a variable energy absorbing mechanism configured to adjust a resistant energy absorbing force of a vehicle occupant during a crash event; and
    a rotatable spool configured to connect to a seat belt webbing and rotatably supported by a base frame;
    wherein the energy absorbing mechanism may absorb an impact energy against the vehicle occupant,
    wherein the variable energy absorbing mechanism comprises a chamber and flexible member,
    wherein an interior wall protrudes inside the chamber,
    wherein the flexible member is mounted on the rotatable spool, and
    wherein the interior wall limits rotation of the rotatable spool to one or less revolutions.

14. The seat belt apparatus of claim 13, wherein the variable energy absorbing mechanism uses a hydraulic action to increase or decrease a resistance of the rotatable spool.

15. The seat belt apparatus of claim 13, wherein the variable energy absorbing mechanism allows a desired length of the seat belt webbing to unwind in reaction to the impact energy of the vehicle occupant acting on the seat belt webbing after the crash event.

16. The seat belt apparatus of claim 13, wherein the variable energy absorbing mechanism further comprises a cover and fluid, and wherein the fluid is a hydraulic or rheological fluid.

17. The seat belt apparatus of claim 13, further comprising a second variable energy absorbing mechanism.

18. A seat belt apparatus, comprising:
    a variable energy absorbing mechanism configured to adjust a resistant energy absorbing force of a vehicle occupant during a crash event; and
    a rotatable spool configured to connect to a seat belt webbing and rotatably supported by a base frame,
    wherein the energy absorbing mechanism may absorb an impact energy against the vehicle occupant,
    wherein the variable energy absorbing mechanism comprises a chamber and flexible member, and
    wherein the flexible member is curved-shaped.

19. The seat belt apparatus of claim 18, wherein the variable energy absorbing mechanism uses a hydraulic action to increase or decrease a resistance of the rotatable spool.

20. The seat belt apparatus of claim 18, wherein the variable energy absorbing mechanism further comprises a cover and fluid, and wherein the fluid is a hydraulic or rheological fluid.

* * * * *